(12) United States Patent
Hying et al.

(10) Patent No.: US 6,383,386 B1
(45) Date of Patent: May 7, 2002

(54) HYDROPHOBIC PERMEABLE COMPOSITE, METHOD FOR PRODUCING SAID COMPOSITE AND USE OF THE SAME

(75) Inventors: Christian Hying, Rhede; Gerhard Hörpel, Nottuln; Bernd Penth, Lebach, all of (DE)

(73) Assignee: Creavis Gesellschaft fuer Technologie und Innovation mbH, Marl (DE)

( * ) Notice: Subject to any disclaimer, the term of this patent is extended or adjusted under 35 U.S.C. 154(b) by 0 days.

(21) Appl. No.: 09/463,413

(22) PCT Filed: Mar. 20, 1999

(86) PCT No.: PCT/DE99/00876

§ 371 Date: Mar. 10, 2000

§ 102(e) Date: Mar. 10, 2000

(87) PCT Pub. No.: WO99/62624

PCT Pub. Date: Dec. 9, 1999

(30) Foreign Application Priority Data

Jun. 3, 1998 (DE) .......................................... 198 24 666

(51) Int. Cl.⁷ ............................................... B01D 71/02
(52) U.S. Cl. .......................... 210/500.25; 210/500.26; 210/490; 210/500.27; 55/523; 55/524; 264/42; 264/45.5
(58) Field of Search ....................... 210/500.25, 500.26, 210/490, 500.27, 500.36, 500.41, 500.2; 55/523, 524; 264/42, 45.5

(56) References Cited

U.S. PATENT DOCUMENTS

| | | | |
|---|---|---|---|
| 4,321,141 A | * | 3/1982 | Messing |
| 4,609,468 A | * | 9/1986 | Gramm |
| 4,981,590 A | * | 1/1991 | Van T'Veen et al. |
| 5,059,366 A | * | 10/1991 | Galaj |
| 5,124,289 A | * | 6/1992 | Martin et al. |
| 5,266,207 A | * | 11/1993 | Bayce et al. |
| 5,342,521 A | * | 8/1994 | Bardot et al. |
| 5,376,442 A | * | 12/1994 | Davidson et al. |
| 5,885,657 A | | 3/1999 | Penth |

FOREIGN PATENT DOCUMENTS

| | | | |
|---|---|---|---|
| GB | 2014868 | * | 9/1979 |

* cited by examiner

*Primary Examiner*—Ana Fortuna
(74) *Attorney, Agent, or Firm*—Oblon, Spivak, McClelland, Maier & Neustadt, P.C.

(57) ABSTRACT

The invention relates to a hydrophobic permeable composite, to a method for producing a hydrophobic permeable composite and to the use of said composite in various processes. Hydrophobic, permeable materials have been known for some time. Plastic materials especially, for example Gore-Tex®, but also materials consisting of other organic polymers are used whenever a material is required to be gas- and steam-permeable but not liquid-permeable. These materials have the disadvantage that they can only be used within a certain temperature range. The inventive composite is characterised by a higher temperature resistance since it consists mainly of inorganic materials. It is also relatively easy to produce since it can be obtained using the sol-gel technique. The inventive composite can be used as a membrane in the oxidation of aromatics, for example in the direct oxidation of benzene to phenol.

35 Claims, 1 Drawing Sheet

Figure 1:
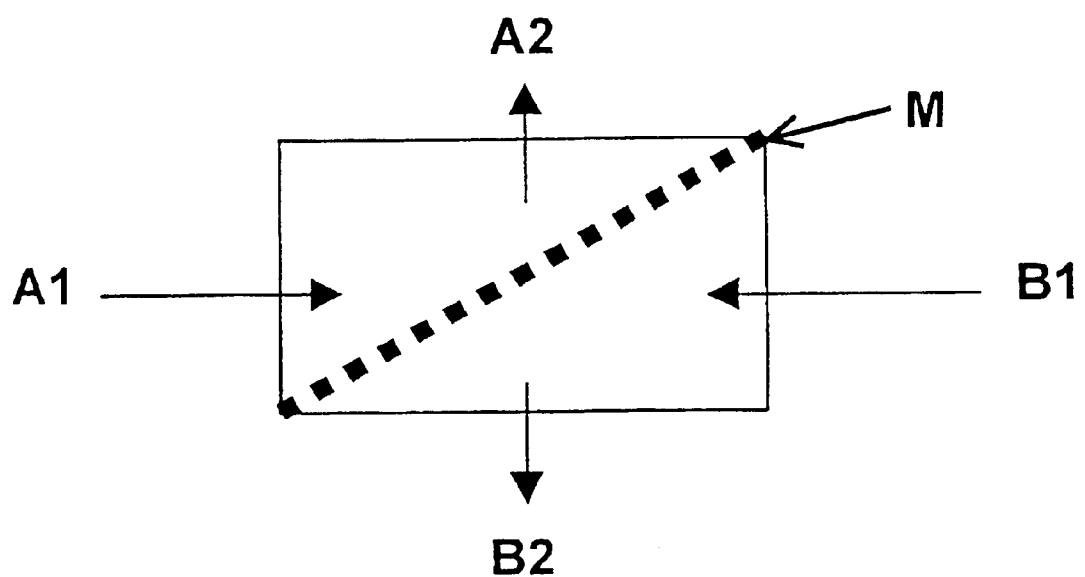

HYDROPHOBIC PERMEABLE COMPOSITE, METHOD FOR PRODUCING SAID COMPOSITE AND USE OF THE SAME

The invention relates to a permeable composite material having hydrophobic properties, to a process for making this permeable composite material and to use of the same.

Hydrophobic permeable materials have been known for many years. Membranes of Teflon (Gore-Tex®) can be cited in particular in this connection, although membranes of other organic polymers are also known. These are suitable for a broad scope of application, based on the principle that substances pass through the porous material exclusively in the form of gas or vapor, but not of fluid. Such materials are made, for example, by stretching Teflon sheets, whereby ultra-fine cracks are formed which subsequently allow the passage of vapor or gas. Water droplets are held back by the hydrophobic material, since high surface tension and the lack of wettability of the surfaces of the hydrophobic materials prevent them from penetrating into the pores.

Such hydrophobic materials are suitable not only for gas and vapor permeation but also for membrane distillation. Furthermore, they are used as inert filter materials in many applications.

A disadvantage of these materials, however, is always the limited temperature range in which they can be used. In contrast, inorganic filter materials are much more thermally stable, although they are often more hydrophilic as well.

Very many substances can be made hydrophobic by subsequent hydrophobing of the most diverse inorganic substrates by means of reactive components such as silanes or alkyl or fluoroalkyl compounds or by deposition of precursor products from the gas phase (CVD), but hydrophobing is possible only in a subsequent process step. To some extent this step is quite complex, and so hydrophobing during the actual process of production of inorganic filter materials would be advantageous. Furthermore, hydrophobing of large surfaces by the CVD technique is impossible or possible only with considerable expense.

The object Of the present invention was therefore to provide a permeable composite material which exhibits hydrophobic properties and has very much smaller pores and very much greater thermal stability than the known materials. Another object was to provide a simple process for making such a composite material.

It has been surprisingly found that it is possible in simple manner, by means of the sol-gel method, to hydrophobe a permeable composite material based on at least one porous and permeable support, which is provided on at least one side of the support and in the interior of the support with at least one inorganic component, which contains substantially at least one compound of a metal, a semi-metal or a mixed metal with at least one element of Group 3 to Group 7, and that such a composite material exhibits high thermal stability.

The subject matter of the present invention is therefore a permeable composite material based on at least one porous and permeable support, which is provided on at least one side of the support and in the interior of the support with an inorganic component, which contains substantially a compound of a metal, a semi-metal and/or a mixed metal with at least one element of Group 3 to Group 7, which material is characterized in that it exhibits hydrophobic properties.

Also subject matter of the present invention is a method for making a permeable composite material according to one of claims 1 to 9, in which at least one suspension which contains at least one inorganic component comprising at least one compound of at least one metal, one semi-metal or one mixed metal with at least one of the elements of Group 3 to Group 7 and a sol, is applied on at least one porous and permeable support, and this suspension is solidified on or in or on and in the support material by at least one heat treatment, which process is characterized in that at least one of the inorganic components used exhibits hydrophobic properties and/or at least one hydrophobic material and/or one hydrophobing agent is added to the sol and/or to the suspension.

Further subject matter of the present invention is the use of a composite material according to at least one of claims 1 to 9 as a membrane for membrane distillations.

The composite material according to the invention has the advantage that it can also be used at higher temperatures than in the case of the materials known heretofore. Consequently there are opened numerous possible applications in which the composite material according to the invention can be used.

The process according to the invention also has the advantage that hydrophobic composite materials can be made without the need to perform additional cost-intensive, time-consuming and/or energy-intensive process steps.

The composite material according to the invention will be described hereinafter by reference to an example, without limiting the composite material according to the invention to this type of embodiment.

The permeable composite material according to the invention, which material exhibits hydrophobic properties, is provided with at least one porous and permeable support as basis. On at least one side of the support and in the interior of the support the support is provided with at least one inorganic component, which substantially contains at least one compound of at least one metal, at least one semi-metal or at least one mixed metal with at least one element of Group 3 to Group 7. As used in the present invention, the term interior of a support refers to cavities or pores in a support.

Preferably the interior and exterior or the interior and the exterior surfaces of the composite material according to the invention are coated with hydrophobic layers. These layers can contain at least alkyl, fluoroalkyl and/or aryl groups. The interior and/or exterior surfaces of the composite material can also be coated, however, with wax and/or polymer layers. The polymer layers can contain hydrophobic materials chosen from polyethylene, polyvinyl chloride, polystyrene, polytetrafluoroethylene, polyvinylidene fluoride, polyvinylidene chloride, polyisoprene, polybutadiene, heat-treated polyimide, heat-treated polyether imide, polysulfone, polyether sulfone, polyacrylate, polyimidazole or a mixture of these polymers. Preferably the hydrophobic material present in the hydrophobic layers has a melting and/or softening point below 500° C.

The composite material according to the invention, which material exhibits hydrophobic properties, preferably contains a proportion of hydrophobic material of from 0.0001 wt % to 40.0 wt %, especially preferably from 0.01 to 20 wt %.

Depending how the composite material according to the invention with hydrophobic characteristics is made, it is conceivable that the hydrophobic material will differ chemically and physically or chemically or physically from the material used to make the composite material.

According to the invention, the porous and permeable support can have interstices with a size of 1 nm to 500 μm. The interstices can be pores, meshes, holes, crystal lattice interstices or cavities The support can contain at least one material chosen from carbon, metals, alloys, glass, ceramics, minerals, plastics, amorphous substances, natural products, composite substances or from at least one combination of these materials. It is permissible for supports which can contain the said materials to have been modified by a chemical, thermal or mechanical treatment method or a combination of treatment methods. Preferably the composite material is provided with a support which contains at least one metal, one natural fiber or one plastic, which was modified by at least one mechanical forming technique or treatment method, such as drawing, upsetting, fulling, rolling, stretching or forging. Quite particularly preferably the composite material is provided with at least one support which contains at least woven, bonded, felted or ceramically bound fibers or at least sintered or bonded shapes, globules or particles. In a further preferred embodiment there can be used a perforated support. Permeable supports can also be such which become or have been made permeable by laser treatment or ion beam treatment.

It can be advantageous if the support contains fibers of at least one material chosen from carbon, metals, alloys, ceramics, glass, minerals, plastics, amorphous substances, composite substances and natural products or fibers of at least one combination of these materials, such as asbestos, glass fibers, carbon fibers, metal wires, steel wires, steel-wool fibers, polyamide fibers, coconut fibers, coated fibers. Preferably there are used supports containing woven fibers of metal or alloys. Wires can also be used as metal fibers. Quite especially preferably the composite material is provided with a support which contains at least one fabric of steel or stainless steel, such as a fabric made by weaving from steel wires, steel fibers, stainless-steel wires or stainless-steel fibers, which fabric preferably has mesh widths of 5 to 500 $\mu$m, especially preferably mesh widths of 50 to 500 $\mu$m, and quite especially preferably mesh widths of 70 to 120 $\mu$m.

The support of the composite material, however, can also comprise at least one expanded metal with a pore size of 5 to 500 $\mu$m. According to the invention, however, the support can also comprise at least one granular, sintered metal, a sintered glass or a metal fleece with a pore width of 0.1 $\mu$m to 500 $\mu$m, preferably of 3 to 60 $\mu$m.

The composite material according to the invention is preferably provided with at least one support which contains at least aluminum, silicon, cobalt, manganese, zinc, vanadium, molybdenum, indium, lead, bismuth, silver, gold, nickel, copper, iron, titanium, platinum, stainless steel, steel, brass, an alloy of these materials or a material coated with Au, Ag, Pb, Ti, Ni, Cr, Pt, Pd, Rh, Ru and/or Ti.

The inorganic component present in the composite material according to the invention can contain at least one compound of at least one metal, semi-metal or mixed metal with at least one element of Group 3 to Group 7 of the Periodic Table or at least one mixture of these compounds. The compounds of the metals, semi-metals or mixed metals can therefore contain at least elements of the subgroups and of Group 3 to Group 5 or at least elements of the subgroups or of Group 3 to Group 5, these compounds having a particle size of 0.001 to 25 $\mu$m. Preferably the inorganic component contains at least one compound of an element of Subgroup 3 to Subgroup 8 or at least one element of Group 3 to Group 5 with at least one of the elements Te, Se, S, O, Sb, As, P, N, Ge, Si, C, Ga, Al or B or at least one compound of an element of Subgroup 3 to Subgroup 8 or at least one element of Group 3 to Group 5 with at least one of the elements Te, Se, S, O, Sb, As, P, N, Ge, Si, C, Ga, Al or B or a mixture of these compounds. Especially preferably the inorganic component containing at least one compound of at least one of the elements Sc, Y, Ti, Zr, V, Nb, Cr, Mo, W, Mn, Fe, Co, B, Al, Ga, In, Tl, Si, Ge, Sn, Pb, Sb or Bi with at least one of the elements Te, Se, S, O, Sb, As, P, N, C, Si, Ge or Ga, such as $TiO_2$, $Al_2O_3$, $SiO_2$, $ZrO_2$, $Y_2O_3$, BC, SiC, $Fe_3O_4$, SiN, SiP, nitrides, sulfates, phosphides, silicides, spinels or yttrium aluminum garnet, or of one of these of the elements themselves. The inorganic component can also contain aluminosilicates, aluminum phosphates, zeolites or partly exchanged zeolites, such as ZSM-5, Na ZSM-5 or Fe ZSM-5 or amorphous microporous mixed oxides, which can contain up to 20% non-hydrolyzable organic compounds, such as vanadium oxide silica glass or alumina silica methylsilicon sesquioxide glasses.

Preferably at least one inorganic component is present in a particle-size fraction with a particle size of 1 to 250 nm or with a particle size of 260 to 10,000 nm.

It can be advantageous if the composite material according to the invention contains at least two particle-size fractions of at least one inorganic component. Likewise it can be advantageous if the composite material according to the invention contains at least two particle-size fractions of at least two inorganic components. The particle-size ratio can range from 1:1 to 1:10,000, preferably from 1:1 to 1:100. The quantitative ratio of the particle-size fractions in the composite material can preferably range from 0.01:1 to 1:0.01.

The permeability of the composite material according to the invention is limited by the particle size of the at least one inorganic component used to particles with a particular maximum size.

The inorganic-component-containing suspension, by means of which the composite material according to the invention is obtainable, can contain at least one liquid chosen from water, alcohol and acid or a combination of these liquids.

In a particularly preferred embodiment of the composite material according to the invention which exhibits hydrophobic properties, the said composite material can be made bendable without destroying the inorganic component solidified in the interior of the support and/or on the support. Preferably the composite material according to the invention is bendable to a minimum radius of as small as 1 mm.

The pore sizes of the permeable composite material exhibiting hydrophobic properties is preferably from 1 nm to 0.5 $\mu$m.

The process according to the invention for making a permeable composite material according to at least one of claims 1 to 9 will be described hereinafter with reference to an example, without being limited thereto.

According to the invention, the known hydrophobing methods, which are used among other purposes for textiles (D. Knittel; E. Schollmeyer; Melliand Textilber. (1998) 79(5) 362–363), can also be used, with minor modification of the formulations, for porous permeable composite materials made, for example, by the process described in PCT/EP98/05939. For this purpose a permeable composite material is treated with a solution containing at least one hydrophobic substance. It can be advantageous if the solution contains as the solvent water, preferably adjusted to a pH of 1 to 3 by means of an acid, preferably acetic acid or hydrochloric acid, and/or an alcohol, preferably ethanol. The proportion of acid-treated water or of alcohol in the solvent can range from 0 to 100 vol %. Preferably the proportion of water in the solvent ranges from 0 to 60 vol % and the proportion of alcohol from 40 to 100 vol %. The solution is prepared by adding 0.1 to 30 wt %, preferably 1 to 10 wt % of a hydrophobic substance to the solvent. Silanes, for example, can be used as hydrophobic substances. Surprisingly, not only is good hydrophobing achieved with highly hydrophobic agents such as triethoxy-(3,3,4,4,5,5,6, 6,7,7,8,8-tridecafluorooctyl)silane, but the desired effect is also achieved completely adequately by a treatment with methyltriethoxysilane or i-butyltriethoxysilane. The solutions are stirred at room temperature to distribute the hydrophobic substances homogeneously in the solution.

The permeable composite material can be treated by dipping, spattering, spraying or similar suitable method. After the composite material has been treated with the solution, it is dried at temperatures of 50 to 200° C., preferably at temperatures of 80 to 150° C. After drying there is obtained a permeable composite material which exhibits hydrophobic properties.

Preferably a composite material as described in PCT/EP98/05939 is used. In this process for making a permeable composite material, at least one suspension containing at least one inorganic component comprising at least one compound of at least one metal, one semi-metal or one mixed metal with at least one of the elements of Group 3 to Group 7 is applied in and on at least one porous and permeable support, and the suspension is solidified on or in or on and in the support material by at least one heat treatment.

In this process it can be advantageous to apply the suspension on and in or on or in at least one support by forcing on, pressing on, pressing in, rolling on, doctoring on, spreading on, dipping, spattering or pouring on.

The porous and permeable support on which or in which or on and in which at least one suspension is applied can contain at least one material chosen from carbon, metals, alloys, ceramics, minerals, plastics, amorphous substances, natural products, composite substances, composite materials or from at least one combination of these materials. As the permeable support there can also be used such made permeable by treatment with laser beams or ion beams. Preferably fabrics of fibers or wires of the materials cited hereinabove are used as supports, examples being metal fabrics or plastic fabrics.

The suspension used, which can contain at least one inorganic component and at least one metal oxide sol, at least one semi-metal oxide sol or at least one mixed metal oxide sol or a mixture of these sols, can be prepared by suspending at least one inorganic component in at least one of these sols.

The sols are obtained by hydrolyzing at least one compound, preferably at least one metal compound, at least one semi-metal compound or at least one mixed-metal compound with at least one liquid, one solid or one gas, in which process it can be advantageous if water, alcohol or an acid, for example, is used as the liquid, ice as the solid or steam as the gas, or if at least one combination of these liquids, solids or gases is used. It can also be advantageous to add the compound to be hydrolyzed to alcohol or an acid or a combination of these liquids before hydrolysis. As the compound to be hydrolyzed there is preferably hydrolyzed at least one metal nitrate, one metal chloride, one metal carbonate, one metal alcoholate compound or at least one semi-metal alcoholate compound, especially preferably at least one metal alcoholate compound, one metal nitrate, one metal chloride, one metal carbonate or at least one semi-metal alcoholate compound chosen from the compounds of the elements Ti, Zr, Al, Si, Sn, Ce and Y or of the lanthanoids and actinoids, such as titanium alcoholates, for example titanium isopropylate, silicon alcoholates, zirconium alcoholates, or a metal nitrate, such as zirconium nitrate.

In this process it can be advantageous to perform the hydrolysis of the compounds to be hydrolyzed with at least half the molar ratio of water, steam or ice relative to the hydrolyzable group of the hydrolyzable compound.

The hydrolyzed compound can be peptized with at least one organic or inorganic acid, preferably with a 10 to 60% organic or inorganic acid, especially preferably with a mineral acid chosen from sulfuric acid, hydrochloric acid, perchloric acid, phosphoric acid and nitric acid or a mixture of these acids.

There can be used not only sols prepared as described hereinabove, but also commercial sols such as titanium nitrate sol, zirconium nitrate sol or silica sol.

It can be advantageous if at least one inorganic component with a particle size of 1 to 10,000 nm is suspended in at least one sol. Preferably there is suspended an inorganic component containing at least one compound chosen from metal compounds, semi-metal compounds, mixed metal compounds and metal mixed compounds with at least one of the elements of Group 3 to Group 7, or at least one mixture of these compounds. Especially preferably there is suspended at least one inorganic component containing at least one compound comprising the oxides of the subgroup elements or the elements of Group 3 to Group 5, preferably oxides chosen from the oxides of the elements Sc, Y, Ti, Zr, Nb, Ce, V, Cr, Mo, W, Mn, Fe, Co, B, Al, In, Tl, Si, Ge, Sn, Pb and Bi, examples being $Y_2O_3$, $ZrO_2$, $Fe_2O_3$, $Fe_3O_4$, $SiO_2$, $Al_2O_3$. The inorganic component can also contain aluminosilicates, aluminum phosphates, zeolites or partly exchanged zeolites, such as ZSM-5, Na ZSM-5 or Fe ZSM-5 or amorphous microporous mixed oxides, which can contain up to 20% nonhydrolyzable organic compounds, such as vanadium oxide silica glass or alumina silica methylsilicon sesquioxide glasses.

Preferably the proportion by weight of the suspended component amounts to 0.1 to 500 times the hydrolyzed compound used.

Freedom from cracks in the permeable composite material can be optimized by appropriate choice of the particle size of the suspended compounds as a function of the size of the pores, holes or interstices of the porous permeable support, and also by the layer thickness of the composite material according to the invention as well as by the proportional ratio of sol, solvent and metal oxide.

In order to increase freedom from cracks in the use of a mesh fabric with a mesh width of 100 $\mu$m, for example, there can preferably be used suspensions which contain a suspended compound with a particle size of at least 0.7 $\mu$m In general, the ratio of particle size to mesh or pore size should range from 1:1000 to 50:1000. The composite material according to the invention can preferably have a thickness of 5 to 1000 $\mu$m, especially preferably 50 to 150 $\mu$m. The suspension of sol and compounds to be suspended preferably has a ratio of sol to compounds to be suspended ranging from 0.1:100 to 100:0.1, preferably from 0.1:10 to 10:0.1 parts by weight.

The suspension present on or in or on and in the support is solidified in this process by heating this composite to 50 to 1000° C. In a special alternative embodiment of this process, this composite is exposed to a temperature of 50 to 100° C. for 10 minutes to 5 hours. In a further special embodiment of the process according to the invention, this composite is exposed to a temperature of 100 to 800° C. for 1 second to 10 minutes.

In this process the heat treatment of the composite can be accomplished by means of heated air, hot air, infrared radiation, microwave radiation or electrically generated heat. In a further special embodiment of this process it can be advantageous if the heat treatment of the composite is performed using the support material for electrical resistance heating. For this purpose the support can be connected to a current source via at least two contacts. With the current turned on the support becomes heated in proportion to amperage of the current source and amplitude of the output voltage, and the suspension present in and on its surface can be solidified by this heating.

In a special embodiment of the process according to the invention, the permeable composite material which exhibits hydrophobic properties can be made by using, in the process for making a permeable composite material described hereinabove and in PCT/EP98/05939 a sol and/or a suspension to which finely divided waxes and/or polymers are added. During solidification of the sol or of the suspension, the waxes and/or polymers are melted at temperatures below 500° C. and surround the particles as a thin film, so that the entire interior and exterior surface of the composite material is covered by a thin wax and/or polymer layer. For this purpose there can be used almost all known polymers or waxes which melt and/or can flow below 500° C., such as polyethylene, polypropylene, polyvinyl chloride, polystyrene, polytetrafluoroethylene, polyvinylidene fluoride, polyvinylidene chloride, polyisoprene, polybutadiene, polyimide, polyether imide, polysulfone, polyether sulfone, polyacrylate, polymethacrylate, polyimidazole or a mixture of these polymers. The waxes and/or polymers do not have to exist as hydrophobic materials, but it is completely adequate when they acquire the hydrophobic properties during the heating phase at a temperature of up to 500° C. by a chemical and/or physical modification of their structure.

In a further embodiment of the process according to the invention, permeable composite materials can be made by adding alkylsilanes, arylsilanes or fluoroalkylsilanes to a sol prepared as described hereinabove or to a suspension prepared as described hereinabove, with which sol or suspension a support is treated in the manner described hereinabove or in PCT/EP98/05939. During the solidification process there takes place partial but adequate orientation of the alkyl, aryl or fluoroalkyl chains, thus imparting a hydrophobic finish to the surfaces. The heat treatment at up to 500° C. does not lead to any substantial degradation of the alkyl components. Such a hydrophobed permeable composite material can be used at temperatures up to 250° C.

By means of the types of processes described here for making permeable composite materials which exhibit hydrophobic properties, there are made accessible, in completely hydrophobed form, materials with pore sizes in the range of 1 nm to 0.5 $\mu$m.

The permeable composite materials according to at least one of claims 1 to 9, which materials exhibit hydrophobic properties, can be used in several areas of separation of substances. In this regard the applications described hereinafter merit special mention, but application of the composite materials is not limited thereto.

The composite material according to the invention can be used as the membrane for membrane distillation. Membranes used for membrane distillation are characterized in that the liquid substance mixture to be separated by distillation must not wet the membranes. At the same time the membranes must be highly thermally stable and must not undergo changes at higher temperatures. In addition, higher distillation temperatures are often accompanied by process-related advantages. The permeable composite materials according to the invention, which materials exhibit hydrophobic properties, are to be preferred to the known membranes in membrane distillations, since they can be used over a broader temperature range without suffering changes in their properties, and at the same time they can be made in a wide range of pore sizes and can be made with thicknesses of less than 100 $\mu$m.

The composite material according to the invention can also be used for pervaporation. Just as in membrane distillation, process-related advantages are also achieved during use in pervaporation of the described hydrophobic, permeable composite materials according to the invention. By virtue of their greater thermal stability, the described composite materials are superior to the conventional materials in organophilic pervaporation. In a special embodiment of the hydrophobic permeable composite materials, organic molecules migrate through more rapidly than water, and so organics can be selectively separated from aqueous solutions in this way.

The composite material according to the invention can also be used as a membrane for vapor permeation. The basis of this process, which resembles pervaporation, is the same mechanism of permeation through a selective membrane as for pervaporation, and so it is clear that separation of organics with a special embodiment of the composite material is possible here also. Thermal stability of the material is particularly important in this case, since vapor permeation sometimes takes place at very high temperatures. The composite materials according to the invention can also be used as membranes to enhance the impregnation of liquids with gases. The problem of impregnation of aqueous liquids with gases is that the gas bubbles are often very large and therefore have a relatively small surface. This can be improved by the use of membranes for impregnation of these fluids with air or other gases. For this purpose the gas is forced through the pores of a membrane into the fluid. The very small bubbles (depending on the chosen pore radius of the membrane) have a very much larger specific surface than bubbles introduced into a fluid by other techniques (M. J. Semmens; C. J. Gantzer, M. J. Bonnette, U.S. Pat. No. 5,674,433). However, pressures greater than the "bubble point" of the corresponding membrane must be applied (up to 30 to 40 bar depending on pore size). In the use of hydrophobic permeable composite materials for such aeration of hydrophilic fluids, the pressures merely have to be higher than the hydrostatic pressure of the fluid, since the fluid cannot penetrate into the pores and thus the associated effects of pore filling and the resulting high "bubble point" do not occur.

The composite materials according to the invention can also be used for concentrating heat-sensitive products. Concentration or dewatering of highly heat-sensitive products can be accomplished by a special module configuration using hydrophobic permeable composite materials. In the process the fluid to be concentrated (such as a fruit juice) is passed along one side of the hydrophobic partition while an externally prepared concentrated salt solution is passed along the other side. Since the partition is hydrophobic, no contact takes place between the two liquids. Nevertheless, water-vapor exchange can occur via the gas space of the pores and so, by virtue of the different osmotic pressure, the salt solution can absorb water and the product to be dewatered can give up water.

A composite material according to the invention can also be used for membrane filtration. Filtration of the most diverse products by means of membranes frequently encounters the problem that the filtrate output is influenced by formation of surface layers. While this so-called fouling can be suppressed by the use of highly hydrophilic membranes, it can also be suppressed by the use of hydrophobic filter materials. In filtration tests using hydrophobic permeable composite materials, the flow always increases in particular when organics are being filtered and the fouling layers consist of highly hydrophilic deposits.

The performance gains by the use of hydrophobic permeable composite materials can range from 10% to 80% in such an arrangement.

The composite materials according to the invention can also be used as membrane reactors. For certain designs of membrane reactors, it can be advantageous to use hydrophobic membranes. These are advantageous in membrane reactors when hydrophobic and hydrophilic constituents of the reaction mixture must be separated from each other or selectively metered through a membrane. In these cases the hydrophobic permeable composite materials according to the invention are highly suitable since, as already pointed out, they exhibit constant properties over a relatively broad temperature range. The composite materials according to the invention can be used, for example, as membranes in membrane reactors in which oxidation of aromatics is taking place, for example the direct oxidation of benzene to phenol.

FIG. 1 schematically shows a practical example of the hydrophobic permeable composite material according to the invention.

FIG. 1 schematically shows a concentration cell. This is divided by the hydrophobic permeable composite material M into two compartments. Liquid A1 from which water is to be removed flows into one compartment. This liquid can be, for example, a fruit juice. A liquid B1 for absorption of water flows into the other compartment. This liquid can be, for example, a concentrated salt solution. Because of the hydrophobic permeable composite material, water from the fruit juice can pass over in the form of vapor into the concentrated salt solution. Since both solutions (A1 and B1) contain predominantly water, however, direct intermixing of the solutions is prevented by the hydrophobic properties of the composite material. Solution A2 depleted of water is transferred out of the one compartment, and the salt solution B2 that has absorbed water is transferred out of the other compartment.

The composite material according to the invention, the process according to the invention for making the said composite material, and the use of the same will be described in more detail in the following examples, without being limited thereto.

EXAMPLE 1.1
Making a Composite Material By the Process Described in PCT/EP98/05939

120 g of titanium tetraisopropylate was intensively stirred with 140 g of deionized ice until ultrafine dispersion of the resulting precipitate. After addition of 100 g of 25% hydrochloric acid, stirring was continued until the phase became clear and 280 g of type CT3000SG α-alumina from Alcoa of Ludwigshafen was added, after which stirring was continued for several days until disintegration of the aggregates. A thin layer of this suspension was then applied on a metal gauze and solidified at 550° C. within the shortest possible time.

EXAMPLE 1.2.a
Hydrophobing of Already Existing Composite Materials

A composite material made according to Example 1.1 was dipped in a solution comprising the following components: 1% Dynasilan F 8261, 2% demineralized water acidified to pH 2.5 with acetic acid, and 97% ethanol. Before use, the solution had to be stirred for 5 hours at room temperature. After supernatant solution had been allowed to drip off, the composite material was dried at 80° C. to 150° C. and then used.

EXAMPLE 1.2.b
Hydrophobing of Already Existing Composite Materials

A composite material made according to Example 1.1 was dipped in a solution comprising the following components: 5% methyltriethoxysilane, 0.5% hydrochloric acid (35%), 40% ethanol and 54.5% demineralized water. Before use, the solution had to be stirred for about 10 minutes at room temperature. After supernatant solution had been allowed to drip off, the composite material was dried at 80° C. to 150° C. and then used.

EXAMPLE 1.3.a.1
Hydrophobing By Addition of Silanes to the Sol For Making the Composite Material 50 g of titanium tetraisopropylate and 40 g Dynasilan F 8261 were intensively stirred with 130 g of deionized ice until ultrafine dispersion of the resulting precipitate. After addition of 100 g of 25% hydrochloric acid, stirring was continued until the phase became clear and 280 g of type CT3000SG α-alumina from Alcoa of Ludwigshafen was added, after which stirring was continued for 3 days until disintegration of the aggregates. This suspension was then applied on a stainless-steel fabric and solidified at about 500° C. within the shortest possible time.

EXAMPLE 1.3.a.2
Hydrophobing By Addition of Silanes to the Sol For Making the Composite Material 50 g of titanium tetraisopropylate and 30 g i-butyltriethoxysilane were intensively stirred with 130 g of deionized ice until ultrafine dispersion of the resulting precipitate. After addition of 100 g of 25% hydrochloric acid, stirring was continued until the phase became clear and 280 g of type CT3000SG α-alumina from Alcoa of Ludwigshafen was added, after which stirring was continued for several days until disintegration of the aggregates. This suspension was then applied on a wire gauze and solidified at about 500° C. within the shortest possible time.

EXAMPLE 1.3.a.3
Hydrophobing By Addition of Silanes to the Sol For Making the Composite Material 50 g of titanium tetraisopropylate and 30 g methyltriethoxysilane were intensively stirred with 130 g of deionized ice until ultrafine dispersion of the resulting precipitate. After addition of 100 g of 25% hydrochloric acid, stirring was continued until the phase became clear and 280 g of type CT3000SG α-alumina from Alcoa of Ludwigshafen was added, after which stirring was continued for several days until disintegration of the aggregates. This suspension was then applied on a wire gauze and solidified at 500° C. within the shortest possible time.

EXAMPLE 1.3.b.1
Hydrophobing By Addition of Silanes to the Sol For Making the Composite Material 60 g of tetraethyl orthosilicate and 40 g of Dynasilan F 8261 were intensively stirred with 120 g of deionized ice until ultrafine dispersion of the resulting precipitate. After addition of 40 g of 65% nitric acid, stirring was continued until the phase became clear. 280 g of type CT530SG α-alumina from Alcoa of Ludwigshafen was added, after which the sol was stirred for 3 days until disintegration of all aggregates. This suspension was then applied on an aluminum gauze and solidified at 500° C. within the shortest possible time.

EXAMPLE 1.3.b.2
Hydrophobing By Addition of Silanes to the Sol For Making the Composite Material The experiment from Example 1.1.b.1 was repeated, but 40 g of methyltriethoxysilane was used instead of the Dynasilan F 8261.

EXAMPLE 1.3.b.1
Hydrophobing By Addition of Silanes to the Sol For Making the Composite Material The experiment from Example 1.1 .b.1 was repeated, but 40 g of i-butyltriethoxysilane was used instead of the Dynasilan F 8261.

EXAMPLE 1.4.a.1
Hydrophobing By Addition of Waxes and/or Polymers 80 g of titanium tetraisopropylate was hydrolyzed with 20 g of water, and the resulting precipitate was peptized with 120 g of nitric acid (25%). This solution was stirred until it became clear and, after addition of 40 g of titanium dioxide from Degussa (P25) and 5 g of polytetrafluoroethylene powder, stirring was continued until disintegration of the agglomerates. This suspension was then applied on a porous support corresponding to Example 1.1 and solidified at 500° C. within the shortest possible time.

EXAMPLE 1.4.a.2
Hydrophobing By Addition of Waxes and/or Polymers

The experiment was repeated with the same parameters as in Example 1.4.a.1. 5 g of polyethylene was used instead of 5 g of polytetrafluoroethylene.

EXAMPLE 1.4.a.3
Hydrophobing By Addition of Waxes and/or Polymers

The experiment was repeated with the same parameters as in Example 1.4.a.1. 5 g of polypropylene was used instead of 5 g of polytetrafluoroethylene.

EXAMPLE 1.4.b
Hydrophobing By Addition of Waxes and/or Polymers 80 g of titanium tetraisopropylate was hydrolyzed with 20 g of water, and the resulting precipitate was peptized with 120 g of nitric acid (25%). This solution was stirred until it became clear and, after addition of 40 g of titanium dioxide from Degussa (P25) and 15 g of polyimide powder, stirring was continued until disintegration of the agglomerates. This suspension was then applied on a porous support corresponding to Example 1.1 and solidified at 500° C. within the shortest possible time. In this case good hydrophobing is achieved only after complete transformation (carbonization and imidization) of the polyimide.

EXAMPLE 1.5
Measurements of the Contact Angle

The following table presents the results of measurements of the contact angle by the resting-drop method for water against air, performed on the composite materials made in Examples 1.1 to 1.4.b.

| Example | Hydrophobing component | Contact angle [°] |
|---|---|---|
| 1.1 | — | 0 |
| 1.2.a. | Dynasilan F 8261 | 145 |
| 1.2.b | Methyltriethoxysilane | 136 |
| 1.3.a.1 | Dynasilan F 8261 | 139 |
| 1.3.a.2 | Methyltriethoxysilane | 134 |
| 1.3.a.3 | i-Butyltriethoxysilane | 110 |
| 1.3.b.1 | Dynasilan F 8261 | 141 |
| 1.3.b.2 | Methyltriethoxysilane | 134 |
| 1.3.b.3 | i-Butyltriethoxysilane | 109 |
| 1.4.a.1 | Polytetrafluoroethylene | 148 |
| 1.4.a.2 | Polyethylene | 132 |
| 1.4.a.3 | Polypropylene | 136 |
| 1.4.b | Polyimide | 108 |

What is claimed is:

1. A permeable composite material, comprising: at least one porous and permeable support which is flexible and which is provided on at least one side thereof and in the interior thereof with an inorganic component, which comprises substantially a compound of a metal, a semi-metal and/or a mixed metal of at least one element of Group III to Group VII of the Periodic Table, the permeable composite material being hydrophobic and having a thickness ranging from 5 to 1,000 μm.

2. The permeable composite material according to claim 1, wherein the interior and exterior or the interior or exterior surfaces of the composite material are coated with hydrophobic layers.

3. The permeable composite material according to claim 2, wherein the interior and/or exterior surfaces of the composite material are coated with at least one layer containing alkyl, fluoroalkyl and/or aryl groups.

4. The permeable composite material according to claim 2, wherein the composite material is coated on the interior and/or exterior surfaces with a wax and/or a polymer layer.

5. The permeable composite material according to claim 2, wherein the hydrophobic material present in the hydrophobic layers has a molting and/or softening point below 500° C.

6. The composite material according to claim 2, wherein the hydrophobic layers contain at least one hydrophobic material selected from the group consisting of polyethylene, polypropylene, polyvinyl chloride, polystyrene, polytetrafluoroethylene, polyvinylidene fluoride, polyvinylidene chloride, polyisoprene, polybutadiene, heat-treated polyimide, heat-treated polyether imide, polysulfone, polyether sulfone, polyacrylate, polymethacrylate, polyimidazole and a mixture of these polymers.

7. The permeable composite material according to claim 1, wherein the hydrophobic permeable composite material contains a proportionate amount of hydrophobic material ranging from 0.0001 to 40 wt. %.

8. The permeable composite material according to claim 7, wherein the hydrophobic permeable composite material contains a proportionate amount of hydrophobic material ranging from 0.01 to 20 wt. %.

9. The permeable composite material according to claim 1, wherein the hydrophobic material differs chemically and physically or chemically or physically from the material employed to make the composite material.

10. The permeable composite material according to claim 1, wherein the hydrophobic permeable composite material has a thickness ranging from 50 to 150 μm.

11. The permeable composite material according to claim 1, wherein the hydrophobic permeable composite material is bendable to a minimum radius as small as 1 mm.

12. The permeable composite material according to claim 1, wherein the inorganic component has a particle size fraction of a particle size of 1 to 250 nm.

13. The permeable composite material according to claim 12, wherein the inorganic component has a particle size fraction of a particle size of 260 to 10,000 nm.

14. The permeable composite material according to claim 12, wherein the composite material comprises at least two particle size fractions of one or two inorganic component(s), wherein the particle size ratio of the fractions ranges from 1:1 to 1:10,000.

15. The permeable composite material according to claim 14, wherein the ratio of the fractions ranges from 1:1 to 1:100.

16. The permeable composite material according to claim 1, wherein the support comprises fibers of at least one material selected from the group consisting of carbon, metals, alloys, ceramics, glass, minerals, plastics, amorphous substances, composite substances and natural fibers.

17. The permeable composite material according to claim 16, wherein the support comprises fibers which are asbestos, glass fibers, carbon fibers, metal wires, steel wires, steel-wool fibers, polyamide fibers, coconut fibers or coated fibers.

18. The permeable composite material according to claim 1, wherein the support is in woven, bonded, felted or ceramically bound fibers or in a sintered or bonded shape, as globules or particles.

19. A process for making a permeable composite material according to claim 1, in which at least one suspension which contains at least one of said inorganic component and a sol, is applied on at least one porous and permeable support, and this suspension is solidified on or in or on and in the support material by at least one heat treatment, wherein at least one of the inorganic components used exhibits hydrophobic properties and/or at least one hydrophobic material and/or one hydrophobing agent is added to the sol and/or to the suspension.

20. A process according to claim 10, wherein the sol and/or the suspension contains hydrophobic materials, hydrophobic particles and/or hydrophobing substances.

21. A process according to claim 11, wherein the hydrophobic materials or particles have a melting or softening point below 500° C.

22. A process according to claim 11, wherein the hydrophobic material is a wax and/or a polymer and/or an alkylsilane, fluoroalkylsilane or arylsilane.

23. A process according to claim 11, wherein the hydrophobic material is, selected from polyethylene, polypropylene, polyvinyl chloride, polystyrene, polytetrafluoroethylene, polyvinylidene fluoride, polyvinylidene chloride, polyisoprene, polybutadiene, polyimide, polyether imide, polysulfone, polyether sulfone, polyacrylate, polymethacrylate, polyimidazole or a mixture of these polymers.

24. A process according to claim 11, wherein the sol contains from 0.001 wt % to 50 wt % of hydrophobic or hydrophobing material.

25. A process according to claim 15, wherein the sol contains from 0.01 wt % to 25 wt % of hydrophobic or hydrophobing material.

26. A process according to claim 11, wherein the hydrophobic or hydrophobing material or the polymer or the wax is modified chemically and physically or chemically or physically by a treatment.

27. The composite material according to claim 1 which is capable of being used as a membrane for membrane distillations.

28. The composite material according to claim 1, which is capable of being used in pervaporation.

29. The composite material according to claim 1, which is capable of being used in vapor permeation.

30. The composite material according to claim 1, which is capable of being used for concentration of heat-sensitive substances.

31. The composite material according to claim 1, which is capable of being used as a membrane in membrane reactors.

32. The composite material according to claim 1, which is capable of being used as a membrane in membrane filtration.

33. The composite material according to claim 1, which is capable of being used for impregnation of liquids with gases.

34. A permeable composite material, comprising:
at least one porous and permeable support which is flexible and which is provided on at least one side thereof and in the interior thereof with a proportionate amount of inorganic component of 0.0001 to 40.0 wt. %, which comprises substantially a compound of a metal, a semi-metal and/or a mixed metal of at least one element of Group III to Group VII of the Periodic Table, the permeable composite material being hydrophobic and having a thickness ranging from 5 to 1,000 $\mu$m.

35. The permeable composite material according to claim 25, wherein the permeable composite material further comprises an alkylsilane, arylsilane or fluoroalkylsilane support in its structure.

* * * * *